United States Patent [19]
Workman et al.

[11] Patent Number: 6,075,082
[45] Date of Patent: *Jun. 13, 2000

[54] CROSS-LINKED POLYMIDE BINDERS FOR CERAMICS MANUFACTURE

[75] Inventors: David P. Workman, Naperville; Kristy M. Bailey, Batavia; Kevin J. Moeggenborg, Naperville, all of Ill.

[73] Assignee: Nalco Chemical Company, Naperville, Ill.

[*] Notice: This patent is subject to a terminal disclaimer.

[21] Appl. No.: 09/162,960

[22] Filed: Sep. 29, 1998

Related U.S. Application Data

[63] Continuation-in-part of application No. 09/039,550, Mar. 16, 1998, Pat. No. 5,908,889, which is a continuation-in-part of application No. 08/984,695, Dec. 3, 1997, Pat. No. 5,922,801.

[51] Int. Cl.$^7$ ............... C08K 3/10; C08G 69/26; C08F 283/10

[52] U.S. Cl. ............ 524/437; 524/430; 524/432; 524/441; 524/446; 524/445; 525/423; 525/438; 523/414; 523/420; 523/427; 523/428; 528/335; 528/338; 528/339; 528/340; 528/341

[58] Field of Search ............... 524/437, 430, 524/432, 441, 445, 446; 528/335, 338, 339, 340, 341; 525/423, 438; 523/414, 420, 427, 428

[56] References Cited

U.S. PATENT DOCUMENTS

| | | | |
|---|---|---|---|
| 2,926,116 | 2/1960 | Keim | 524/608 |
| 2,926,154 | 2/1960 | Keim | 524/608 |
| 2,990,396 | 6/1961 | Clark | 528/95 |
| 3,250,664 | 5/1966 | Conte et al. | 528/340 |
| 3,607,622 | 9/1971 | Espy | 528/342 |
| 4,277,581 | 7/1981 | Vanlerberghe et al. | 528/342 |
| 4,968,460 | 11/1990 | Thompson et al. | 264/6 |
| 5,053,484 | 10/1991 | Speranza et al. | 528/340 |
| 5,266,243 | 11/1993 | Kneller et al. | 264/6 |
| 5,268,233 | 12/1993 | Heller et al. | 264/44 |
| 5,324,812 | 6/1994 | Speranza et al. | 528/340 |
| 5,358,911 | 10/1994 | Moeggenborg et al. | 264/670 |
| 5,382,323 | 1/1995 | Furman et al. | 162/111 |
| 5,487,855 | 1/1996 | Moeggenborg et al. | 524/437 |
| 5,525,665 | 6/1996 | Moeggenberg et al. | 524/432 |
| 5,532,307 | 7/1996 | Bogan | 524/443 |
| 5,536,775 | 7/1996 | Curatolo et al. | 524/442 |
| 5,567,353 | 10/1996 | Bogan | 524/437 |
| 5,663,286 | 9/1997 | Ahmed et al. | 528/340 |
| 5,726,267 | 3/1998 | Howland et al. | 524/413 |
| 5,908,889 | 6/1999 | Bailey et al. | 524/437 |

*Primary Examiner*—James J. Seidleck
*Assistant Examiner*—Olga Asinovsky
*Attorney, Agent, or Firm*—Michael B. Martin; Thomas M. Breininger

[57] ABSTRACT

A method for binding ceramic materials in aqueous media is disclosed. The method utilizes water-soluble cross-linked polyamides prepared by condensation polymerization for binding various classes of ceramic materials.

25 Claims, No Drawings

CROSS-LINKED POLYMIDE BINDERS FOR CERAMICS MANUFACTURE

The present application is a continuation-in-part of application Ser. No. 09/039,550 now U.S. Pat. No. 5,908,889, filed Mar. 16, 1998 entitled "Polyamide Binders for Ceramics Manufacture" which is in turn a continuation-in-part of copending application Ser. No. 08/984,695 now U.S. Pat. No. 5,922,801 entitled "Polyamide Binders for Ceramics Manufacture" filed on Dec. 3, 1997, the disclosure of which is hereby incorporated by reference.

FIELD OF THE INVENTION

A method for binding ceramic materials in aqueous media is disclosed. The method utilizes water-soluble cross-linked polyamides prepared by condensation polymerization for binding various classes of ceramic materials.

BACKGROUND OF THE INVENTION

Ceramic materials are commonly prepared by mixing powdered ceramic oxides such as magnesia, alumina, titania and zirconia, in a slurry along with additives, such as dispersants and binders. The slurry may be spray dried to produce ceramic particles. The particles are formed into an aggregate structure, called a "green ceramic," having a desired shape and subsequently subjected to a severe heat treatment known as sintering. The sintering process converts the green ceramic into a cohesive "fired ceramic", having a nearly monolithic polycrystalline ceramic phase.

The binder serves to hold the ceramic particles of the green ceramic in the desired shape after forming. The binder can also provide lubrication while the particles are pressed. Preferably, the binder combusts or vaporizes completely during the sintering process leaving no trace of the binder in the fired ceramic. In performing these functions, binders significantly affect the properties of the fired ceramics which are ultimately produced.

In commercial practice, poly(vinyl alcohols) are widely used as ceramic binders. Additionally, poly(ethylene oxide) and ethylene-vinyl acetate copolymers reportedly have been used as binders for particulate material, such as granular silica gel.

For example, polymeric binders containing substantially hydrolyzed copolymers made from monomers having ester or amide functional groups, poly(vinylformamide) or a copolymer of vinyl alcohol and vinyl amine are disclosed in U.S. Pat. Nos. 5,358,911; 5,487,855 and 5,525,665.

Spray drying is an evaporative process in which liquid is removed from a slurry containing a liquid and a substantially non-volatile solid. The liquid is vaporized by direct contact with a drying medium, usually air, in an extremely short retention time, on the order of about 3 to about 30 seconds. The primary controlling factors in a spray drying process are particle size, particle size distribution, particle shape, slurry density, slurry viscosity, temperature, residence time, and product moisture.

The viscosity of the slurry must be suitable for handling and spray-drying. Although spray-drying equipment conditions may be adjusted to handle a variety of viscosities, larger particles will usually result from higher viscosity slurries.

Those of ordinary skill in the art are familiar with the spray-drying process used in the production of ceramic materials, and will be able to optimize the control factors of spray-drying to best advantage. Alternatively, the spray drying or dry pressing processes may be replaced by other well known forming methods, such as granulation, tape casting and slip casting.

Spray drying of the slurry produces substantially dry, free-flowing powder particles which contain the ceramic, the binder and the optional materials described above. The dry particles are granules which are generally spheroidal in shape and have an effective diameter of about 50 to about 300 micrometers. Typically, about 0.5 percent to about 8 percent of the binder, based on the dry weight of the ceramic powder, is present in the dry particles.

In granulation, a mixture of dry powder or powders is mixed or rolled, commonly in a barrel shaped apparatus. Water and/or a binder solution is sprayed into the mixing powder causing aggregation of the small particles into larger granules. The size of the granules is controlled by the amount of material sprayed into the powders and the speed with which it is sprayed. Granulated powders may be screened to a desired size and pressed to shape in a pressing operation prior to sintering. Alternatively, the granules themselves may be the desired product and may be sintered directly.

Tape casting is commonly used to produce thin substrates for the electronics industry. In the process, a thick ceramic slurry containing ceramic powder, dispersant and binders is prepared. This slurry is cast onto a smooth surface such as a MYLAR or plastic sheet and the thickness is controlled by passing the sheet under a blade which smoothes the slurry surface and scrapes off excess material. The slurry tape is dried to a plastic state and cut and shaped to specification. The amount of binders present in tape casting is very high, typically on the order of 15 to 20 wt. % of the ceramic powder mass.

In fluidized bed spray drying, small "seed" particles are placed in a column and hot air is blown into the seed powder from below suspending the particles in the column. A ceramic slurry is sprayed onto the seed particles from above, causing them to grow. When the particles reach a large enough size, they are siphoned out of the dryer while more seed particles are introduced. This process can produce powder for further forming processes, or the powder itself may represent the desired product, in which case it would be sintered to produce the final ceramic.

The dry particles are compacted to produce an aggregate, green ceramic structure. Preferably, the particles are compacted by pressing in dies having an internal volume which approximates the shape desired for the final fired ceramic product. Alternatively, the particles are compacted by roll compacting or other well-known compacting methods. The spray dried blend of powder, binder, and optional surfactants and lubricants is relatively free flowing so that it can enter and closely conform to the shape of the pressing dies.

Inside the dies, the dry particles are subjected to a pressure which is typically in the range of about 2000 to about 50,000 psi. Pressing the particles produces an aggregate structure, called a green ceramic, which retains its shape after removal from the die.

One forming technique used for spray dried or granulated material is roll compaction, also referred to as roll pressing. This technique takes a dry powder and crushes it between two rollers in a continuous process. This process produces sheets of ceramic of various widths and thicknesses. These sheets can be cut to shape and sintered to produce the final ceramic body. The process is commonly used to produce ceramic substrates for the electronics industry.

Dry pressing involves filling a shaped die with spray dried or granulated powder and pressing it at high pressures. The pressing occurs through movable pistons at the top and/or bottom of the die cavity. The process can be used to produce fairly complex geometries in a single forming step. The ceramic body that results is ejected from the die and sintered to produce a final ceramic product.

Isostatic pressing is similar to dry pressing in that a ceramic powder is pressed in a die cavity. In isostatic pressing, however, all or part of the die wall consists of a flexible material. After filling the die cavity with powder, the die is submerged in a liquid pressure chamber and pressure is applied to squeeze the die and compact the powder. Unlike dry pressing, no movable parts are involved. Isostatic pressing is commonly used on large or very long parts to minimize cracking or lamination of the final ceramic green body.

Extrusion involves the pushing of a concentrated, plastic, slurry through an orifice. The orifice is of the size and shape of the desired ceramic body. This process is commonly used to produce ceramic tubes or similarly shaped pieces. The slurry used is prepared from dry powders which are mixed with water, organic binders and lubricants, and a coagulant. This slurry is usually predried in a filter press or similar apparatus to remove excess water and thicken the slurry to a plastic material. The material is then extruded through a press which is either piston or screw driven. The extruded material is cut to length, dried, and sintered.

Jiggering is commonly used in the whiteware industry to shape an extruded or filter pressed ceramic slurry. Typically, a portion of the plastic slurry is placed on a rotating wheel and shaped by rollers and/or knife blades to a desired geometry. This body is then dried and sintered.

Another ceramic forming method, that is used for parts of complex shape, is slip casting. In slip casting, a concentrated ceramic slurry (slip) is poured into a mold with an internal shape of the desired ceramic body. The slurry used must be highly concentrated to prevent settling of particles and/or excessive shrinkage during drying. At the same time, the slip must be fluid enough to completely fill the mold and allow escape of air bubbles. The presence of a polymeric binder adds strength to the cast body preventing breakage during mold removal and handling of the body prior to sintering.

Heating the aggregate structure drives off volatile materials such as water, and burns off organic materials, such as binders, plasticizers, dispersants or surfactants. When a sufficiently high temperature is reached, the particles of the aggregate structure begin to fuse, but do not fuse completely, and become fastened to one another to produce a relatively strong fired ceramic material having essentially the desired shape.

The slurry is, for example, spray dried to produce substantially dry particles which include the polymer. The particles are preferably pressed to produce an aggregate, green ceramic structure and heated to produce a fired ceramic material. Alternatively, the particles can be formed into an aggregate, green ceramic structure by roll compaction or other well-known methods.

Many references describe the use of polymers as aids in the manufacture of ceramics. However, such polymers are generally formed by radical-induced polymerization of vinylic monomers. Substantially hydrolyzed copolymers formed from vinylic esters and amides are disclosed in U.S. Pat. Nos. 5,358,911; 5,525,665 and 5,487,855 for ceramics production. A hydrolyzed terpolymer formed from maleic anhydride, N-vinyl pyrrolidinone and a third vinyl monomer for preparing ceramic oxide materials is disclosed in U.S. Pat. No. 5,266,243. A method for dispersing one or more ceramic materials in an aqueous medium utilizing a polymer formed from hydroxy functional monomers and acid-containing monomers is disclosed in U.S. Pat. Nos. 5,532,307 and 5,567,353. A method for preparing sintered shapes utilizing the reaction product of an amine other than an alkanolamine with a hydrocarbyl-substituted carboxylic acylating agent is described in U.S. Pat. No. 5,268,233, and a method for increasing green fracture strength of a ceramic part utilizing polymers of vinylic monomers is disclosed in U.S. Pat. No. 4,968,460. Nylon-type resinous products have also been utilized for improving wet strength in papermaking in U.S. Pat. No. 3,250,664.

Polyamides, and their cross-linked derivatives, are known. Water soluble polyamide syntheses are disclosed in U.S. Pat. Nos. 5,053,484 and 5,324,812. Moreover, condensation polymers have been cross-linked and utilized as Yankee Dryer Adhesives as disclosed in U.S. Pat. No. 5,382,323. Cross-linked polyamino-polyamides have been disclosed as cosmetic compositions for hair in U.S. Pat. No. 4,277,581. Amino-polyamide-acrylamide adducts reacted with polyaldehydes have been disclosed as wet strength agents in U.S. Pat. No. 3,607,622. Polyamides are reacted with epichlorohydrins to form resins for use as wet strength agents in U.S. Pat. Nos. 2,926,154 and 2,926,116.

Furthermore, it is known that some post-polymerization modifications may enhance the activity of polymers utilized in ceramics manufacturing. For example, U.S. Pat. No. 5,268,233 describes post-treatments with reagents such as aldehydes and epoxides of polymers which are the result of reaction of alkanolamine and a hydrocarbyl-substituted carboxylic acid acylating agent. Use of cross-linking agents such as epoxides and polyhydric alcohols to increase green fracture strength of polymers which are the result of free radical polymerizations has been disclosed in U.S. Pat. No. 4,968,460.

However, none of these references disclose the cross-linked poly(aminoamide) condensation polymers described herein, for ceramics manufacturing.

Therefore, although commercially available binders are satisfactory for many applications, a need still exists for improved binders which provide still greater strength and/or green density in green ceramic materials. Greater green strength is advantageous because it reduces breakage during handling of the green ceramics and, generally, is associated with higher quality fired ceramics. Our polymeric binders provide the requisite increase in green strength.

SUMMARY OF THE INVENTION

A method for binding ceramic materials in aqueous media is disclosed. The method utilizes water-soluble cross-linked polyamides prepared by condensation polymerization for binding various classes of ceramic materials.

DESCRIPTION OF THE INVENTION

The present invention relates to polymeric binders for preparing ceramic materials. Other possible uses for the condensation polymers described herein include using the polymers as binders in investment casting shells, as water-reducing aids for gypsum wallboard manufacture or as dispersants for metal oxides and/or carbon black. The method can be used to produce fired ceramic materials from ceramic powders. Suitable powders include but are not limited to: aluminum oxide, silicon nitride, aluminum nitride, silicon carbide, silicon oxide, magnesium oxide, lead oxide, zirconium oxide, titanium oxide and neodymium oxide. The powder can have a weight-averaged median particle size in the range of a few nanometers to about ½ millimeter. Powders having a median size in the range of about 0.5 to about 10 micrometers are preferred.

One aspect of this invention is an unfired, ceramic precursor material comprising a mixture of:
a) a ceramic powder selected from the group consisting of aluminum oxide, silicon nitride, aluminum nitride, silicon carbide, silicon oxide, magnesium oxide, lead oxide, zirconium oxide, titanium oxide, steatite, barium titanate, lead zirconate titanate, clays, ferrite, yttrium oxide, zinc oxide, tungsten carbide, neodymium oxide and combinations thereof and
b) a water soluble cross-linked condensation polymer, obtained by polymerizing compounds to form a condensation polymer and then cross-linking said condensation polymer,
wherein said condensation polymer is obtained by polymerization of at least two compounds as follows:
i) at least one carbonyl compound having at least two functional groups of the structure

wherein Z is selected from the group consisting of —OH; —OR$_1$ wherein R$_1$ is selected from the group consisting of linear, cyclic or branched alkylene groups having from one to eight carbon atoms, aromatic groups, polycyclic groups and heteroaromatic groups; —Cl; —Br and —F; with
ii) at least one polyamine compound having at least two amine groups selected from the group consisting of:
polyamines of the formula

wherein R$_2$ and R$_3$ may be the same or different and are selected from the group consisting of linear, cyclic or branched alkylene groups having from two to eight carbon atoms, aromatic groups, heteroaromatic groups and polycyclic groups;
polyamines of the formula

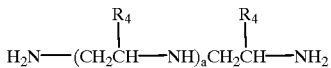

wherein R$_4$ is selected from the group consisting of hydrogen, C$_1$–C$_4$ alkyl groups and combinations thereof, and a is an integer ranging from 0–8; and
polyamines of the formula

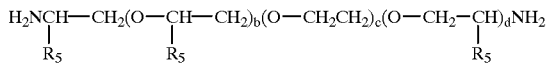

wherein the sum of b+d ranges from about 0 to 8, c ranges from about 2 to about 50 and R$_5$ is selected from the group consisting of hydrogen, alkyl groups of one to four carbon atoms and combinations thereof;
said condensation polymer so formed then cross-linked with a cross-linking agent, wherein said cross-linking agent is a compound having at least two functional groups selected from the group consisting of: epoxides, aldehydes, carboxylic acids and combinations thereof.

Another aspect of this invention is a condensation polymer is obtained by polymerization of at least three compounds as follows:
i) at least one carbonyl compound having at least two functional groups of the structure

wherein Z is selected from the group consisting of —OH; —OR$_1$ wherein R$_1$ is selected from the group consisting of linear, cyclic or branched alkylene groups having from one to eight carbon atoms, aromatic groups, polycyclic groups and heteroaromatic groups; —Cl; —Br and —F;
ii) at least one polyamine compound having at least two amine groups selected from the group consisting of:
polyamines of the formula

wherein R$_2$ and R$_3$ may be the same or different and are selected from the group consisting of linear, cyclic or branched alkylene groups having from two to eight carbon atoms, aromatic groups, heteroaromatic groups and polycyclic groups;
polyamines of the formula

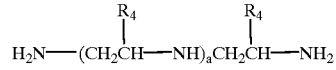

wherein R$_4$ is selected from the group consisting of hydrogen, C$_1$–C$_4$ alkyl groups and combinations thereof, and a is an integer ranging from 0–8; and
polyamines of the formula

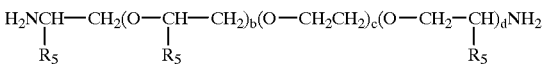

wherein the sum of b+d ranges from about 0 to 8, c ranges from about 2 to about 50 and R$_5$ is a selected from the group consisting of hydrogen, alkyl groups of one to four carbon atoms and combinations thereof; with
iii) at least one aromatic epoxy resin having at least two epoxide groups, said condensation polymer so formed then cross-linked with a cross-linking agent, wherein said cross-linking agent is a compound having at least two functional groups selected from the group consisting of: epoxides, aldehydes, carboxylic acids and combinations thereof.

Furthermore the aromatic epoxy resin having at least two epoxide groups of step iii) may be first reacted with a polyamine prior to condensation with said compound of step i) and said polyamine of step ii).

Yet another aspect of this invention is a method for preparing a ceramic material, which comprises the steps of:
a) mixing a ceramic powder with an aqueous solution containing a water-soluble cross-linked condensation polymer to produce a slurry, said water-soluble cross-linked condensation polymer obtained by polymerizing compounds to form a condensation polymer and then cross-linking said condensation polymer, wherein said condensation polymer is obtained by polymerization of at least two compounds as follows:

i) at least one carbonyl compound having at least two functional groups of the structure

wherein Z is selected from the group consisting of —OH; $OR_1$ wherein $R_1$ is selected from the group consisting of linear, cyclic or branched alkylene groups having from one to eight carbon atoms, aromatic groups, polycyclic groups and heteroaromatic groups; —Cl; —Br and —F, with ii) at least one polyamine compound having at least two amine groups selected from the group consisting of:

polyamines of the formula $H_2N$—$R_2$—NH—$R_3$—$NH_2$ wherein $R_2$ and $R_3$ may be the same or different and are selected from the group consisting of linear, cyclic or branched alkylene groups having from two to eight carbon atoms, aromatic groups, heteroaromatic groups and polycyclic groups;

polyamines of the formula

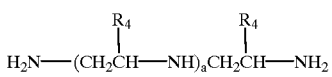

wherein $R_4$ is selected from the group consisting of hydrogen, $C_1$–$C_4$ alkyl groups and mixtures thereof, and a is an integer ranging from 0–8; and polyamines of the formula

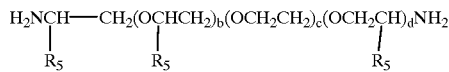

wherein the sum of b+d ranges from about 0 to 8, c ranges from about 2 to about 50 and $R_5$ is selected from the group consisting of: hydrogen, alkyl groups of one to four carbon atoms and combinations thereof; said condensation polymer so formed then cross-linked with a cross-linking agent, wherein said cross-linking agent is a compound having at least two functional groups selected from the group consisting of: epoxides, aldehydes, carboxylic acids and combinations thereof;

b) drying said slurry by a process selected from the group consisting of: filter pressing, fluidized bed spray drying, roll compaction, spray drying and tape casting to produce particles which include said water-soluble cross-linked condensation polymer;

c) compacting said particles by a process selected from the group consisting of: dry pressing, extrusion, isostatic pressing, jiggering and slip casting to produce an aggregate structure; and d) heating said aggregate structure to produce a fired ceramic material.

For the practice of any aspect of this invention, one example included in the general class of compounds described above is a dicarboxylic acid which may be of the formula

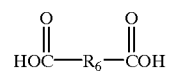

wherein $R_6$ is selected from the group consisting of linear, cyclic or branched alkylene groups having from one to eight carbon atoms, aromatic groups, polycyclic groups and heteroaromatic groups. Moreover, the dicarboxylic acid may have at least four carbon atoms. The dicarboxylic acid may be adipic acid, sebacic acid, terephthalic acid, or said dicarboxylic acids may be mixtures of sebacic acid and adipic acid, or terephthalic acid and adipic acid, among others.

For the practice of any aspect of this invention, the polyamine may be of the formula

For example, the diamine may be diethylene triamine. The polyamine may also be of the formula

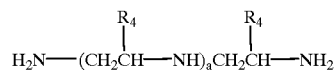

wherein $R_4$ may be selected from the group consisting of hydrogen, $C_1$–$C_4$ alkyl groups and combinations thereof, and a is an integer ranging from 0–8. Additionally, the polyamine may be a polyoxyalkylene diamine of the formula

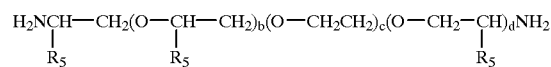

wherein the sum of b+d ranges from about 0 to 8, c ranges from about 2 to about 50 and $R_5$ is a hydrogen or an alkyl group of one to four carbon atoms. Moreover, the polyamine may be 4,7,10-trioxa-1,13-tridecane diamine.

The aromatic epoxy resin may be any aromatic compound containing two or more epoxide groups. Preferably, the aromatic epoxy resin may be selected from the group consisting of: 2,2-bis(4-hydroxyphenyl) propane diglycidyl ether; 2,2'-[(1-methylethylidene)bis(4,1-phenleneoxymethylene)]bisoxirane homopolymer; resorcinol diglycidyl ether and hydroquinone digylcidyl ether.

The post-polymerization cross-linking agent may be any compound containing two or more reactive functional groups, such as epoxides. For example useful polyepoxide cross-linkers include triglycidyl tris(2-hydroxyethyl) isocyanurate, glycerol polyglycidyl ether, trimethylolpropane polyglycidyl ether, diglycerol polyglycidyl ether, and polyglycerol polyglycidyl ether, sorbitol polyglycidyl ether and pentaerythritol polyglycidyl ether among others.

The following materials may also be added to any aspect of this invention: another different cross-linked water-soluble condensation polymer (of the general type as described herein), a polyethylene glycol, a poly(vinyl alcohol), polyethylene oxide, a poly(ethylene oxide/propylene oxide), glycerol or other processing additives known to those skilled in the art.

For the practice of any aspect of this invention, the water-soluble cross-linked condensation polymer described herein may be from about 0.1% to about 15% by weight of total ceramic material. Moreover, the water-soluble cross-linked condensation polymer may be from about 1% to about 5% by weight of total ceramic material.

In one aspect, the ceramic powder is mixed with an aqueous solution containing a polymer to produce a slurry. Preferably, the solution is prepared using deionized water. The slurry may also contain lubricants and surfactants, such as dispersants and anti-foaming agents.

It is also recognized that the properties of a ceramic such as, but not limited to, green density, surface quality or milling characteristics, may be varied as desired by adjusting the molecular weight of the polymer used in the binder composition.

The condensation polymer is made by condensing one or more carboxylic acids, ester or anhydride with one or more polyamine and an aromatic epoxy resin. Preferably, the condensation polymer is prepared by condensing one or more polycarboxylic acids, esters or anhydrides with one or more polyamines and the reaction product of an aromatic epoxy resin with one or more polyamines. As is generally understood, the term amines encompasses any compound having a trisubstituted nitrogen group. Therefore, said amines may be multifunctional.

One example of compounds having the general structure described above is a dicarboxylic acid having the structure:

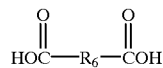

wherein $R_6$ is a linear, cyclic, or branched alkylene group having from one to eight carbon atoms, an aromatic group, a polycyclic group or a heteroaromatic group (as utilized herein the terms carboxylic acid, ester or anhydride are meant to also encompass multifunctional compounds which are carboxylic acids, esters or anhydrides also containing other functional groups; or more than two acid, ester or anhydride groups) which may be reacted with a polyamine having the structure:

wherein $R_2$ and $R_3$ may be the same or different and are linear, cyclic or branched alkylene groups containing from 2–8 carbon atoms, aromatic groups, polycyclic groups or heteroaromatic groups. Polyamines having heteroaromatic groups include aziridines, azetidines, azolidines, tetra- and dihydropyridines, pyrroles, indoles, piperidines, imidazoles, di- and tetrahydroimidazoles, piperazines, isoindoles, purines, morpholines, thiomorpholines, N-aminoalkylmorpholines, N-aminoalkylthiomorpholines, N-minoalkylpiperazines, N,N'diaminoalkylpiperazines, azepines, azocines, azonines, azecines and tetra-, di- and perhydro derivatives of each of the above and mixtures of two or more of these heterocyclic amines.

The aromatic group can be a single aromatic nucleus, such as a benzene nucleus, a pyridine nucleus, a thiophene nucleus, a 1,2,3,4-tetrahydronaphthalene nucleus, or a polynuclear aromatic moiety. Such polynuclear moieties can be of the fused type, that is wherein at least two aromatic nucleii are fused at two points to another nucleus such as found in naphthalene, anthracene, and the azanaphthalenes among others. Such polynuclear aromatic moieties can also be of the linked type wherein at least two nuclei (either mono or polynuclear) are linked through bridging linkages to each other. Such bridging linkages can be selected from the group consisting of carbon-to-carbon single bonds, ether linkages, keto linkages, sulfide linkages, polysulfide linkages of 2 to 6 sulfur atoms, sulfinyl linkages, sulfonyl linkages, methylene linkages, alkylene linkages, di-(lower alkyl)-methylene linkages, lower alkylene ether linkages, alkylene keto linkages, lower alkylene sulfur linkages, lower alkylene polysulfide linkages of 2 to 6 carbon atoms, amino linkages, polyamino linkages and mixtures of such divalent bridging linkages.

The condensation polymer is made up of dimeric repeating units, such as in the structure:

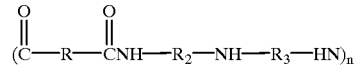

Wherein n is an integer providing a weight average molecular weight of at least 1,000, and preferably at least 7,500, or higher.

The above dicarboxylic acid is preferably a diacid containing at least four carbon atoms, and is most preferably adipic acid, i.e.

most preferably,

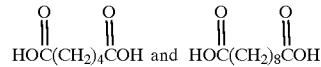

The diamine above is preferably those polyamines obtained from condensation reactions of ethylene and propylene amine, or mixtures thereof, which polyamines have the structure:

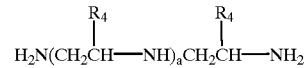

wherein R is chosen at each occurrence, from the group consisting of H, $C_1$–$C_4$ alkyl groups, or combinations thereof; and a is an integer ranging from 0–8, preferably from 0–4, and most preferably 1–2.

Since the reaction product can contain mixtures both in terms of different acids and/or different amines, and also with different molecular weights, both with the same or different difunctional acids and/or polyamine, one may have mixtures of condensation polymers.

The polyamine may also be of the formula:

wherein $R_7$ and $R_8$ may be $C_1$–$C_4$ alkyl, preferably ethyl, propyl or isopropyl; R' may be hydrogen or $C_1$–$C_4$ alkyl, preferably hydrogen or methyl; and x is an integer of from about 1 to about 10.

The polyamine may also be a relatively low molecular weight poly(alkylene glycol) diamine of the formula:

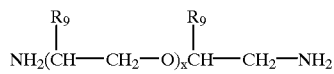

where x is from about 2 to 5, $R_9$ is hydrogen or an alkyl of one to four carbon atoms and the polyethylene glycol diamine has $M_w$ of at least 100 with a mixture of ethylene oxide and propylene oxide. In a preferred embodiment of the invention, R is hydrogen. Also, x preferably averages from about 2 to about 3. When $R_9$ is hydrogen and x is 2, the material is triethylene glycol diamine (JEFFAMINE EDR-148 amine). When $R_9$ is hydrogen and x is 3, the reactant is tetraethylene glycol diamine (JEFFAMINEEDR-192 AMINE). It will be appreciated that throughout this description x is understood to be an average value of the distribution of polymers present, rather than an absolute number indicating a completely pure material.

The polyoxyalkylene diamine reactants useful in this invention have the structure:

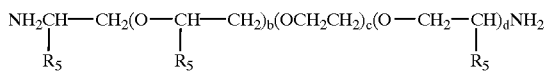

where the sum of b+d ranges from about 0 to about 8, c ranges from about 2 to about 50 and $R_5$ is an alkyl group of one to four carbon atoms. Again, b, c and d are to be understood as average values in many instances. In a preferred embodiment, the ethylene oxide moieties denoted by b represent at least 50% of the molecule. Stated in another way, this could be represented as:

$$\frac{c}{b+c+d} > 0.5$$

The JEFFAMINE ED series diamines fall within this definition:

|  | b + d = | c = |
| --- | --- | --- |
| JEFFAMINE ED-600 | 3.5 | 13.5 |
| JEFFAMINE ED-900 | 3.5 | 20.5 |
| JEFFAMINE ED-2001 | 3.5 | 45.5 |

These JEFFAMINES are available from Texaco.

More than one polyoxyalkylene diamine within this definition may be used as desired to affect the properties of the final polyamide. Preferably, $R_5$ is methyl and the sum of b+d ranges from about 3 to 4. Alternatively, b and d are independently 1 or 2 and some, but not all, of the ethoxy moiety subscripted by c could be propoxy.

The aromatic epoxy resin compounds suitable for use in preparing the polymeric condensation products of this invention are organic compounds having at least two reactive epoxy groups. These compounds are aromatic and can contain substituent groups such as alkyl, aryl, organic ester, phosphate ester, halogen, cyano group among others without interfering with the condensation. The aromatic epoxy resin compounds may also have olefinic unsaturation on substituents. The preferred aromatic epoxy resin compounds are the aryl substituted compounds having as the sole reactive groups under the conditions of the reaction, at least two epoxy groups and wherein oxygen is present only in oxirane, ether and ester arrangement. Particularly preferred are the compounds consisting only of carbon, hydrogen and oxygen wherein oxygen is present only in oxirane, ether and ester arrangement, and wherein the epoxy groups are terminal groups of an aryl substituted compound.

It is to be understood that the invention is not limited to the foregoing compounds alone and a variety of aromatic epoxy resin compounds can be used.

A mixture of two or more aromatic epoxy resins can be used for the practice of this invention, or if desired, the polyamine can be reacted successively with different aromatic epoxy resins to obtain the condensation polymers.

Examples of aromatic epoxy resins useful for the practice of this invention include bisphenol A epichlorohydrin (condensate, resin, copolymer or epoxy resin) also known as 2,2-bis(4-hydroxyphenyl) propane epichlorohydrin (copolymer, polymer or condensate) and 4,4'-(1-methylethylidene)bisphenol polymer with (chloromethyl) oxirane; and the diglycidyl ether of 2,2-bis(4-hydroxyphenyl)-propane among others.

The aromatic epoxide having at least two epoxide groups may first be reacted with a polyamine having at least two amine groups selected from the group consisting of:

polyamines of the formula

wherein $R_2$ and $R_3$ may be the same or different and are selected from the group consisting of linear, cyclic or branched alkylene groups having from two to eight carbon atoms, aromatic groups, heteroaromatic groups and polycyclic groups;

polyamines of the formula

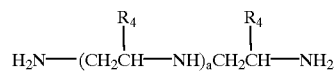

wherein $R_4$ is selected from the group consisting of hydrogen, $C_1$–$C_4$ alkyl groups and combinations thereof, and a is an integer ranging from 0–8; and polyamines of the formula

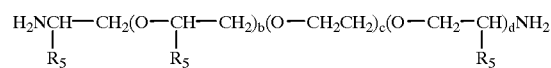

wherein the sum of b+d ranges from about 0 to 8, c ranges from about 2 to about 50 and $R_5$ is an alkyl group of one to four carbon atoms prior to condensation with said compound of step i) and said polyamine of step ii).

Many modifications may be made in the process of this invention without departing from the spirit and scope thereof which are defined only in the appended claims. For example, one skilled in the art may discover that particular reaction conditions, sequences, polyamines and dicarboxylic acids which may not be explicitly recited herein, but which are nevertheless anticipated, would give optimal or otherwise desirable results. In some instances, for example, it may be preferable to react the aromatic epoxy resin with a preformed polyaminoamide or simultaneously polymerize the polyacid, polyamine and aromatic epoxy resin.

As used herein, the term JEFFAMINE D-190 describes polyoxypropylene diamine having the structure:

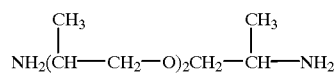

As used herein, the term JEFFAMINE D-230 describes polyoxypropylene diamine having the structure:

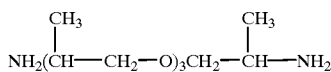

As used herein, the term JEFFAMINE D-400 describes polyoxypropylene diamine having the structure:

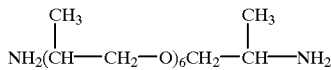

The reaction conditions and variants to obtain the condensation polymers are described below, and also have been described in the following references: U.S. Pat. No. 2,926,116; U.S. Pat. No. 2,926,154 and U.S. Pat. No. 3,607,622, each of which are hereby incorporated by reference.

It has been found particularly preferable to use in the reaction mixture wherein for said acid, ester or anhydride the ester, acid or anhydride functionality is in a molar ratio of approximately 1:1 with the amine functionality of the amine utilized.

According to one embodiment of the invention, the condensation polymers of the invention are prepared as follows: A poly(aminoamide) condensation polymer may be prepared from a 0.85/1–1/0.85 molar ratio of polyamine/diacid (dicarboxylate) where the polyamine consists of a mixture of a polyamine and the reaction product of an aromatic epoxy resin and either the same or a different polyamine. Prior to use, the polymer may be first diluted to 5–60% polymer in solution and/or acidified to pH=5.0–10.0 as is convention in the art. The preferred polyamine and diacid (dicarboxylate) of the invention are diethylenetriamine and adipic acid (or its esters), respectively. Additional preferred polyamines and diacids are disclosed herein. Sulfuric acid is typically used to adjust the pH of the backbone solution, but the identity of the acid is not critical to the invention. Acetic acid, phosphoric acid, and hydrochloric acid can also be used. The use of hydrochloric acid would, however, be less desirable since it would introduce chloride ions into the product.

The only upper limitation on the molecular weight of the copolymers is that they are of any molecular weight which allows water-solubility.

The following examples are presented to describe preferred embodiments and utilities of the invention and are not meant to limit the invention unless otherwise stated in the claims appended hereto.

EXAMPLE 1

The polyamide condensation polymers were made by condensation polymerization in the following manner. 191.6 g of amine was weighed directly into the flask. That flask was equipped with resin head, stirrer, thermometer, thermocouple, distillation trap, and condenser; then stirred and cooled. Then, about half of the DI water (i.e., half of 132.6 g) was added to the reactor, followed by adding 292 g adipic acid to the reactor while maintaining the reaction temperature at less than 90° C. Immediately after adding all of the adipic acid, external cooling was ceased. Heating to approximately 185° C. was begun. When the mixture reached about 123° C., water began to distill, and was removed continuously through the trap and collected in a graduated cylinder.

Heating was continued until the solution reached 185° C. Next, the solution was maintained at that temperature for three hours blanketed in $N_2$. At the end of 3 hours, the solution was air cooled to about 140–150° C., followed by careful addition of 417.2 g DI water. Next the solution was reheated to boiling and maintained at boiling for 60 minutes, then cooled to room temperature.

Condensation polymers 2–6 of Table I were prepared according to this technique, and have the physical characteristics as described below.

TABLE I

| Polymer | Amine | Acids | Ratio Amine/Acid | $M_w$ | $M_n$ |
|---|---|---|---|---|---|
| 2 | A | C | 0.9/1.0 | 215000 | 7050 |
| 3 | A | C | 0.95/1.0 | 23600 | 6100 |
| 4 | A | D/C | 0.95/.33/.67 | 4400 | 2700 |
| 5 | A | E/C | 0.95/.33/.67 | 3000 | 2000 |
| 6 | A | D/C | 0.98/.33/.67 | 15200 | 5000 |

A = Diethylene Triamine, available from Aldrich Chemical Co. of Milwaukee, Wisconsin
C = $HO_2C(CH_2)_4CO_2H$ (adipic acid), available from Aldrich Chemical Co. of Milwaukee, Wisconsin
D = $HO_2C (CH_2)_8 CO_2H$ (sebacic acid), available from Aldrich Chemical Co. of Milwaukee, Wisconsin
E = Terephthalic acid, available from Aldrich Chemical Co. of Milwaukee, Wisconsin

EXAMPLE 2

The following procedure was utilized to form a condensation terpolymer, wherein one of the polyamines to be condensed is first pre-reacted with a polyepoxide. In this instance, a terpolymer of adipic acid, diethylene triamine and diethylene triamine/EPON 828 reaction product was formed. 17.52 g of EPON 828, a Bisphenol A epoxy resin available from Shell Chemical of Houston, Tex., was mixed with 75.52 g of diethylenetriamine under a nitrogen blanket at 130° C. for 2 hours. After cooling to about 50° C., 106.96 g of adipic acid and 100 g of DI water were added to the reactor. The mixture was heated to 185° C. while distilling off water. After 3 hours at 185° C., the solution was cooled to about 150° C. and 180 g of DI water was added carefully. The solution was heated at boiling for 1 hour and cooled to room temperature. The BFV (Brookfield Viscosity) of the resulting product was 1700 cps (spindle 1, 1.5 rpm).

EXAMPLE 3

The following procedure was utilized to form another condensation terpolymer, wherein one of the polyamines to be condensed is first pre-reacted with a polyepoxide. In this instance, a terpolymer of adipic acid, diethylene triamine and diethylene triamine/EPON 828 reaction product was formed. 3.8 g of EPON 828 and 78.5 g of diethylenetriamine were heated under a nitrogen blanket at 130° C. for 2 hours. After cooling to about 50° C., 117.7 g of adipic acid and 100 g of DI water were added. The mixture was heated to 185° C. while distilling off water. After 3 hours at 185° C., the solution was cooled to about 150° C. and 180 g of DI water was added carefully. The solution was heated at boiling for 1 hour and cooled to room temperature. The BFV of the resulting product was 648 cps (spindle 1, 1.5 rpm).

EXAMPLE 4

The cross linked polyamides were prepared in the following manner. 553.5 g of Poly(adipic acid/diethylene triamine/Bisphenol A epoxy resin- diethylene triamine adduct) (40.7%), prepared according to procedure of Example 3 was weighed directly into the flask. 1.33 g of a polyepoxide, sorbitol polyglycidyl ether (available from Nagase America Corp. of New York, N.Y.) was also weighed directly into the reaction flask. Dosage was 0.6% based on polymer actives. The flask was equipped with resin head, stirrer, thermometer and thermocouple. The reaction mixture was heated to 60° C. with stirring for 1.0 hour then cooled to room temperature. The BFV of the resulting product was 5150 cps (spindle 3, 6 rpm), where the BFV of the starting polymer was only 1200 cps (spindle 3, 6 rpm). This increase indicates that cross-linking has occurred.

EXAMPLE 5

The cross-linked condensation polymers were tested as binders for alumina particles of the type that are commonly used for producing ceramic materials according to the following procedure.

The slip was prepared as follows: 1500g slips were prepared to 80 weight percent alumina powder (92% alumina based blend from a Northeastern ceramics manufacturer) in water using 0.12 weight percent (polymer/powder) of the polymer dispersant. To each slip so prepared, the polymeric treatment to be tested was added, to be a total of 2.0 weight percent (polymer/powder) level. Next, each binder-containing slip was propeller mixed at 800 rpm for one hour. For any necessary dilution, deionized water was added to attain the tabulated powder solids level.

The milled slurry was spray dried in a Yamato DL-41 laboratory spray dryer. Dryer operating conditions were: 250° C. air inlet temperature, atomizing air setting of 1.2, slurry feed pump setting of 5, and drying air feed rate of 0.7 cubic meters per minute. A dry powder was produced which was recovered, screened and stored overnight in a 20 percent relative humidity chamber.

The screened powder was pressed into nine pellets in a Carver laboratory press, three at 10,000 pounds per square inch pressing force, three at 15,000 pounds per square inch pressing force, and three at 25,000 pounds per square inch pressing force. The pellets were approximately 28.7 millimeters in diameter and 5 to 6 millimeters in height. The dimensions and weights of the pellets were measured and the pellets were crushed to determine the force required to break them. Diametral compression strength (DCS) for each of the pellets was determined from the breaking force and the pellet dimensions. The average diametral compression strength in megapascals for each set of three pellets is presented below in Table II.

Green body diametral compressional strength is important in ceramics applications for the following reasons. The principal function of the binder is to hold the compacted form together after pressing. The method utilized for determination of suitable "green strength" is the diametral compression strength or DCS of a cylindrical section across its diameter. DCS is actually a measure of tensile strength. The unit of measurement of pressure tolerance is the megapascal (Mpa). Typical values for DCS of "green" parts are in the range of 0.3–3.0 Mpa. A higher DCS value indicates a more efficient binder. Table II shows that the polymers of the instant invention act as effective ceramic binders.

Since a greater density is more desirable, the results of Table II illustrate that the cross-linked polymers of the instant invention are advantageous in this respect also. The fact that a higher green strength can be obtained at an equivalent density to that obtained in the non-cross-linked condensation polymer is advantageous for the ceramics manufacturing process. Accordingly the water-soluble cross-linked condensation polymer is an improvement over the non-cross-linked version.

TABLE II

| Pressure (psi) | Treatment 1[1] | Treatment 2[2] |
|---|---|---|
| | Green Strength | |
| 10000 | 0.388 | 0.747 |
| 15000 | 0.638 | 0.945 |
| 25000 | 1.078 | 1.337 |
| | Green Density | |
| 10000 | 2.1753 | 2.1921 |
| 15000 | 2.2657 | 2.2536 |
| 25000 | 2.3527 | 2.3432 |

[1]polyamide condensation polymer as prepared in Example 3
[2]Cross-linked polyamide condensation polymer prepared according to the procedure of Example 4.

Changes can be made in the composition, operation and arrangement of the present invention described herein without departing from the concept and scope of the invention as defined in the following claims:

1. An unfired, ceramic precursor material comprising a mixture of:

a) a ceramic powder selected from the group consisting of aluminum oxide, silicon nitride, aluminum nitride, silicon carbide, silicon oxide, magnesium oxide, lead oxide, zirconium oxide, titanium oxide, steatite, barium titanate, lead zirconate titanate, clays, ferrite, yttrium oxide, zinc oxide, tungsten carbide, neodymium oxide and combinations thereof and b) a water soluble cross-linked condensation polymer, wherein the water soluble cross-linked polymer is prepared by polymerizing a water soluble condensation polymer and a cross-linking agent having at least two functional groups selected from the group consisting of: epoxides, aldehydes, carboxylic acids and combinations thereof, wherein the water soluble condensation polymer is obtained by polymerizing at least two compounds selected from:

i) at least one carbonyl compound having at least two functional groups of the structure

wherein Z is selected from —OH; —OR$_1$ wherein R$_1$ is selected from linear, cyclic or branched C$_1$–C$_8$ alkylene groups, aromatic groups, polycyclic groups, heteroaromatic groups, —Cl, —Br and —F;

ii) at least one polyamine having at least two amine groups selected from polyamines of the formula H$_2$N—R$_2$—NH—R$_3$—NH$_2$
wherein R$_2$ and R$_3$ may be the same or different and are selected from linear, cyclic or branched C$_2$–C$_8$ alkylene groups, aromatic groups, heteroaromatic groups and polycyclic groups; polyamines of the formula

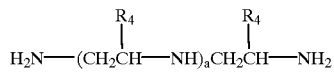

wherein R$_4$ and R$_4$, are independently selected from hydrogen and C$_{1/-C4}$ alkyl groups and a is an integer of from 0–8; and polyamines of the formula

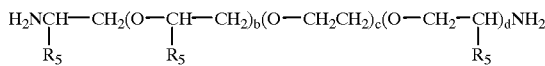

wherein the sum of b+d is from 0 to about 8, c is from about 2 to about 50 and $R_5$ and $R_5$, are independently selected from hydrogen and $C_1$-$C_4$ alkyl groups.

2. The material of claim 1 wherein said cross-linking agent is a polyepoxide selected from the group consisting of sorbitol polyglycidyl ether, glycerol polyglycidyl ether, trimethylolpropane polyglycidyl ether and pentaerythritol polyglycidyl ether.

3. The material of claim 1 wherein said carbonyl compound is of the formula

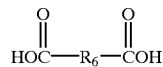

wherein $R_6$ is selected from the group consisting of linear, cyclic or branched alkylene groups having from one to eight carbon atoms, aromatic groups, polycyclic groups and heteroaromatic groups.

4. The material of claim 3 wherein said carbonyl compound has at least four carbon atoms.

5. The material of claim 4 wherein said carbonyl compound is selected from the group consisting of adipic acid, sebacic acid, terephthalic acid and combinations thereof.

6. The material of claim 1 wherein said polyamine compound is selected from the group consisting of: diethylene triamine and 4,7,10-trioxa-1,13-tridecane diamine.

7. An unfired, ceramic precursor material comprising a mixture of:
a) a ceramic powder selected from the group consisting of aluminum oxide, silicon nitride, aluminum nitride, silicon carbide, silicon oxide, magnesium oxide, lead oxide, zirconium oxide, titanium oxide, steatite, barium titanate, lead zirconate titanate, clays, ferrite, yttrium oxide, zinc oxide, tungsten carbide, neodymium oxide and combinations thereof and
b) a water soluble cross-linked condensation polymer, wherein the water soluble cross-linked polymer is prepared by polymerizing a water soluble condensation polymer and a cross-linking agent having at least two functional groups selected from the group consisting of: epoxides, aldehydes, carboxylic acids and combinations thereof, wherein the water soluble condensation polymer is obtained by polymerizing at least three compounds selected from:
i) at least one carbonyl compound having at least two functional groups of the structure

wherein Z is selected from —OH; —$OR_1$ wherein $R_1$ is selected from linear, cyclic and branched $C_1$-$C_8$ alkyl groups, aromatic groups, polycyclic groups; heteroaromatic groups; —Cl; —Br and —F;
ii) at least one polyamine having at least two amine groups selected from polyamines of the formula $H_2N$—$R_2$—NH—$R_3$—$NH_2$
wherein $R_2$ and $R_3$ may be the same or different and are selected from the group consisting of linear, cyclic or branched $C_2$-$C_8$ alkylene groups, aromatic groups, heteroaromatic groups and polycyclic groups;
polyamines of the formula

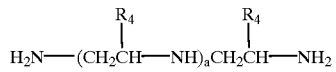

wherein $R_4$ and $R_4$, are independently selected from hydrogen and $C_1$-$C_4$ alkyl groups and a is an integer of from 0 to about 8; and
polyamines of the formula

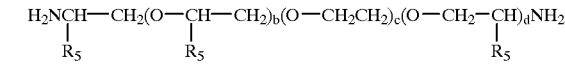

wherein the sum of b+d ranges is from 0 to about 8, c is from about 2 to about 50 and $R_5$ and $R_5$, are independently selected from hydrogen and $C_1$-$C_4$ alkyl groups; and
iii) at least one aromatic epoxy resin having at least two epoxide groups.

8. The material of claim 7 wherein said aromatic epoxy resin is selected from the group consisting of: 2,2-bis(4-hydroxyphenyl) propane diglycidyl ether, 2,2'-((1-methylethylidene)bis(4,1-phenyleneoxymethylene)) bisoxirane diglycidyl ether and hydroquinone diglycidyl ether.

9. The material of claim 7 wherein said aromatic epoxy resin is first reacted with a polyamine prior to polymerization with said carbonyl compound of step i) and said polyamine compound of step ii).

10. The material of claim 1 further comprising an additive selected from the group consisting of: cross-linked water-soluble condensation polymers, polyethylene glycol, poly(vinyl alcohol), polyethylene oxide, and combinations thereof.

11. The material of claim 1 wherein said water-soluble cross-linked condensation polymer is from about 0.1% to about 15% by weight of total ceramic material.

12. The material of claim 1 wherein said water-soluble cross-linked condensation polymer is from about 0.1% to about 9% by weight of total ceramic material.

13. A method for preparing a ceramic material comprising
a) mixing a ceramic powder with an aqueous solution containing a water-soluble cross-linked condensation polymer to produce a slurry, the water-soluble cross-linked condensation polymer prepared by polymerizing a water soluble condensation polymer and a cross-linking agent having at least two functional groups selected from the group consisting of: epoxides, aldehydes, carboxylic acids and combinations thereof, wherein the water soluble condensation polymer is obtained by polymerizing at least two compounds selected from:
i) at least one carbonyl compound having at least two functional groups of the structure

wherein Z is selected from —OH; —$OR_1$ wherein $R_1$ is selected from linear, cyclic or branched $C_1$-$C_8$ alkyl groups, aromatic groups, polycyclic groups, heteroaromatic groups, —Cl, —Br and —F, ii) at least one polyamine having at least two amine groups selected from
polyamines of the formula $H_2N—R_2—NH—R_3—NH_2$
wherein $R_2$ and $R_3$ may be the same or different and are selected from linear, cyclic or branched $C_2-C_8$ alkylene groups, aromatic groups, heteroaromatic groups and polycyclic groups,
polyamines of the formula

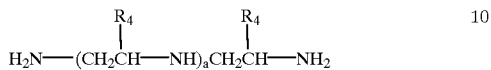

wherein $R_4$ and $R_4$ are independently selected from hydrogen and $C_1-C_4$ alkyl groups and a is an integer of from 0 to about 8; and
polyamines of the formula

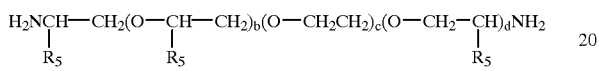

wherein the sum of b+d is from 0 to about 8, c is from about 2 to about 50 and $R_5$ and $R_5$ are independently selected from hydrogen and $C_1-C_4$ alkyl groups;
b) drying the slurry by a process selected from the group consisting of: filter pressing, fluidized bed spray drying, spray drying and tape casting to produce particles which include the water-soluble cross-linked condensation polymer;
c) compacting the particles by a process selected from the group consisting of: dry pressing, extrusion, isostatic pressing, roll compaction, jiggering and slip casting to produce an aggregate structure; and
d) heating said aggregate structure to produce a fired ceramic material.

14. The method of claim 13 wherein said particles are produced by granulation and step c) is selected from the group consisting of dry pressing, roll compaction and isostatic pressing.

15. The method of claim 13 wherein said cross-linking agent is a polyepoxide selected from the group consisting of sorbitol polyglycidyl ether, glycerol polyglycidyl ether, polyglycerol polyglycidyl ether, trimethylol polyglycidyl ether and pentaerythritol polyglycidyl ether.

16. The method of claim 13 wherein said carbonyl compound of is of the formula

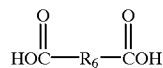

wherein $R_6$ is a linear, cyclic or branched alkylene group having from one to eight carbon atoms, aromatic groups, polycyclic groups and heteroaromatic groups.

17. The method of claim 16 wherein said carbonyl compound has at least four carbon atoms.

18. The method of claim 17 wherein said carbonyl compound is selected from the group consisting of: adipic acid, sebacic acid, terephthalic acid and combinations thereof.

19. The method of claim 13 wherein said polyamine compound is selected from the group consisting of: diethylene triamine and 4,7,10-trioxa-1,13-tridecane diamine.

20. A method for preparing a ceramic material comprising a) mixing a ceramic powder with an aqueous solution containing a water-soluble cross-linked condensation polymer to produce a slurry, the water-soluble cross-linked condensation polymer prepared by polymerizing a water soluble condensation polymer and a cross-linking agent having at least two functional groups selected from the group consisting of: epoxides, aldehydes, carboxylic acids and combinations thereof, wherein the water soluble condensation polymer is obtained by polymerizing at least three compounds selected from:
i) at least one carbonyl compound having at least two functional groups of the structure

wherein Z is selected from —OH; —$OR_1$ wherein $R_1$ is selected from linear, cyclic or branched $C_1-C_8$ alkyl groups, aromatic groups, polycyclic groups, heteroaromatic groups, —Cl, —Br and —F,
ii) at least one polyamine having at least two amine groups selected from
polyamines of the formula $H_2N—R_2—NH—R_3—NH_2$
wherein $R_2$ and $R_3$ may be the same or different and are selected from linear, cyclic or branched $C_2-C_8$ alkylene groups, aromatic groups, heteroaromatic groups and polycyclic groups,

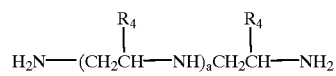

wherein $R_4$ and $R_4$, are independently selected from hydrogen and $C_1-C_4$ alkyl groups and a is an integer of from 0 to about 8,
polyamines of the formula

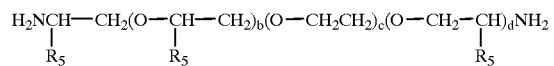

wherein the sum of b+d is from 0 to about 8, c is from about 2 to about 50 and $R_5$ and $R_5$, are independently selected from hydrogen and $C_1-C_4$ alkyl groups, and
iii) at least one aromatic epoxy resin having at least two epoxide groups;
b) drying the slurry by a process selected from the group consisting of: filter pressing, fluidized bed spray drying, spray drying and tape casting to produce particles which include the water-soluble cross-linked condensation polymer;
c) compacting the particles by a process selected from the group consisting of: dry pressing, extrusion, isostatic pressing, roll compaction, jiggering and slip casting to produce an aggregate structure; and
d) heating said aggregate structure to produce a fired ceramic material.

21. The method of claim 20 wherein said aromatic epoxy resin is selected from the group consisting of: 2,2-bis(4- hydroxyphenyl) propane diglycidyl ether, 2,2'-((1-methylethylidene)bis(4,1-phenyleneoxymethylene)) bisoxirane homopolymer, resorcinol digylcidyl ether and hydroquinone diglycidyl ether.

22. The method of claim 20 wherein said aromatic epoxy resin is first reacted with a polyamine prior to polymerization with said carbonyl compound of step i) and said polyamine compound of step ii).

23. The method of claim 13 further comprising mixing an additive with said ceramic powder and said water-soluble cross-linked condensation polymer of step a) selected from the group consisting of: cross-linked water-soluble condensation polymers, polyethylene glycol, poly(vinyl alcohol), polyethylene oxide and combinations thereof.

24. The method of claim 13 wherein said water-soluble cross-linked condensation polymer is from about 0.1% to about 15% by weight of the total ceramic material.

25. The method of claim 13 wherein said water-soluble cross-linked condensation polymer is from about 0.1% to about 9% by weight of the total ceramic material.

* * * * *